(12) United States Patent
Ice

(10) Patent No.: US 11,820,608 B2
(45) Date of Patent: Nov. 21, 2023

(54) SYSTEM AND METHOD FOR DUAL DENSITY SORTER

(71) Applicant: AEGIS SORTATION LLC, Louisville, KY (US)

(72) Inventor: Kenneth Jay Ice, Louisville, KY (US)

(73) Assignee: AEGIS SORTATION LLC, Louisville, KY (US)

( * ) Notice: Subject to any disclaimer, the term of this patent is extended or adjusted under 35 U.S.C. 154(b) by 81 days.

(21) Appl. No.: 17/406,017

(22) PCT Filed: Feb. 19, 2020

(86) PCT No.: PCT/US2020/018794
§ 371 (c)(1),
(2) Date: Aug. 18, 2021

(87) PCT Pub. No.: WO2020/172251
PCT Pub. Date: Aug. 27, 2020

(65) Prior Publication Data
US 2022/0194717 A1 Jun. 23, 2022

Related U.S. Application Data

(60) Provisional application No. 62/807,305, filed on Feb. 19, 2019.

(51) Int. Cl.
*B65G 47/84* (2006.01)
(52) U.S. Cl.
CPC ........ *B65G 47/844* (2013.01); *B65G 2207/36* (2013.01)

(58) Field of Classification Search
CPC ... B65G 47/84; B65G 47/844; B65G 2207/36
USPC .................................................. 198/370.02
See application file for complete search history.

(56) References Cited

U.S. PATENT DOCUMENTS

| | | | |
|---|---|---|---|
| 4,319,676 A | 3/1982 | Turnbough | |
| 4,530,441 A * | 7/1985 | Miller | F27D 1/0013 220/215 |
| 4,732,259 A | 3/1988 | Yu et al. | |
| 5,167,315 A | 12/1992 | Doane | |
| 5,333,715 A * | 8/1994 | Sapp | B65G 47/844 198/370.02 |
| 5,613,591 A * | 3/1997 | Heit | B65G 47/844 198/370.02 |
| 6,478,144 B1 * | 11/2002 | Sweazy | B65G 47/844 198/370.02 |
| 7,506,743 B2 * | 3/2009 | Enomoto | B65G 17/42 198/370.02 |
| 7,779,986 B2 | 8/2010 | Enomoto | |
| 7,921,984 B2 * | 4/2011 | Ripkens | B65G 17/005 198/448 |
| 8,727,096 B2 * | 5/2014 | Schroader | B65G 47/844 198/370.01 |

(Continued)

*Primary Examiner* — Douglas A Hess
(74) *Attorney, Agent, or Firm* — Dickinson Wright PLLC

(57) ABSTRACT

A sorting system is provided. The sorter system includes a conveyor frame, slats disposed on the conveyor frame and extending substantially perpendicularly to a central axis of the conveyor frame. Shoes are disposed on the slat and are moveable between a central position adjacent to the central axis of the conveyor frame, and a distal position adjacent to one of a first and second side of the conveyor frame.

10 Claims, 6 Drawing Sheets

(56) References Cited

U.S. PATENT DOCUMENTS

| | | |
|---|---|---|
| 8,776,982 B2 | 7/2014 | Onayama |
| 9,290,331 B2 * | 3/2016 | Fye ...................... B65G 47/844 |
| 9,409,727 B2 * | 8/2016 | German ................ B65G 13/10 |
| 9,470,702 B2 * | 10/2016 | Pollack .................. G01N 35/04 |
| 9,795,995 B2 * | 10/2017 | Zimmer .................... B07C 5/36 |
| 11,167,937 B2 * | 11/2021 | Ice ........................ B65G 47/844 |
| 11,511,948 B2 * | 11/2022 | Robbins ................ H01H 50/44 |

* cited by examiner

SYSTEM AND METHOD FOR DUAL DENSITY SORTER

CROSS-REFERENCE TO RELATED APPLICATION(S)

This Application is a National Stage entry, under 35 U.S.C. § 371, of international Application PCT/US2020/018794, filed Feb. 19, 2020, which claims priority from U.S. Provisional Application 62/807,305 filed on Feb. 19, 2019, in the United States Patent Office, the entire contents of which are incorporated herein by reference.

BACKGROUND

1. Field

Apparatuses and methods consistent with example embodiments relate to the field of conveyors and/or sorters and conveyor and/or sorter operation, and more particularly sortation conveyor systems including sliding shoe sorters.

2. Description of the Related Art

As a background, conveyor and/or sorter industry always wants to sort more packages per hour.

SUMMARY

Example embodiments may address at least the above problems and/or disadvantages and other disadvantages not described above. Also, exemplary embodiments are not required to overcome the disadvantages described above, and may not overcome any of the problems described above.

Example embodiments of the present disclosure address the desire to sort more packages per hour by providing a design and/or methodology that can results in an equivalent of two sorters on a slightly wider equipment platform—that may effectively doubling the package handling throughput.

Example implementations of certain embodiments of the present invention provide a system and method comprising a two-sided sorter design with shoes centrally located (generally in the middle of a conveyor widthwise) and movable to either side of the conveyor/sorter thereby allowing product to exit from both sides of the dual-density sorter. For example, and by no mean as a limitation, a sorter that is not a dual-density platform can sort about 11,000 packages per hour, while a dual-density according to exemplary embodiments of the present disclosure can sort up to about 21,000 packages per hour.

Example embodiments of the present disclosure allow for continuous dual package input and dual package output. According to an example implementation, a design offers a centrally located rail which facilitates the ability to use a single slat to accommodate one or two shoes. For example, two shoes can be positioned (or "docked") in a centrally located docking pod that resides on the slat.

Another example embodiment of the present disclosure can provides a design configured with two slats (one per shoe) where the shoes can move to opposite sides of sorter. Such a configuration can add complexity to the overall design, but may be implemented as an alternative or complimentary configuration if desired. On the other hand possible advantages of a single slat design, where two shoes are accommodate on one slat, include for example easier maintenance.

According to example embodiments of the present disclosure, respective component of sorter and/or conveyor systems disclosed herein can incorporate any and/or all features and advantages of systems, components, and/or methodologies disclosed in PCT/US18/50025 filed Sep. 7, 2018, PCTUS18/66877 filed Dec. 20, 2018, and PCT/US18/67375 filed Dec. 21, 2018, the disclosures of which are incorporated herein by reference in their entireties.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
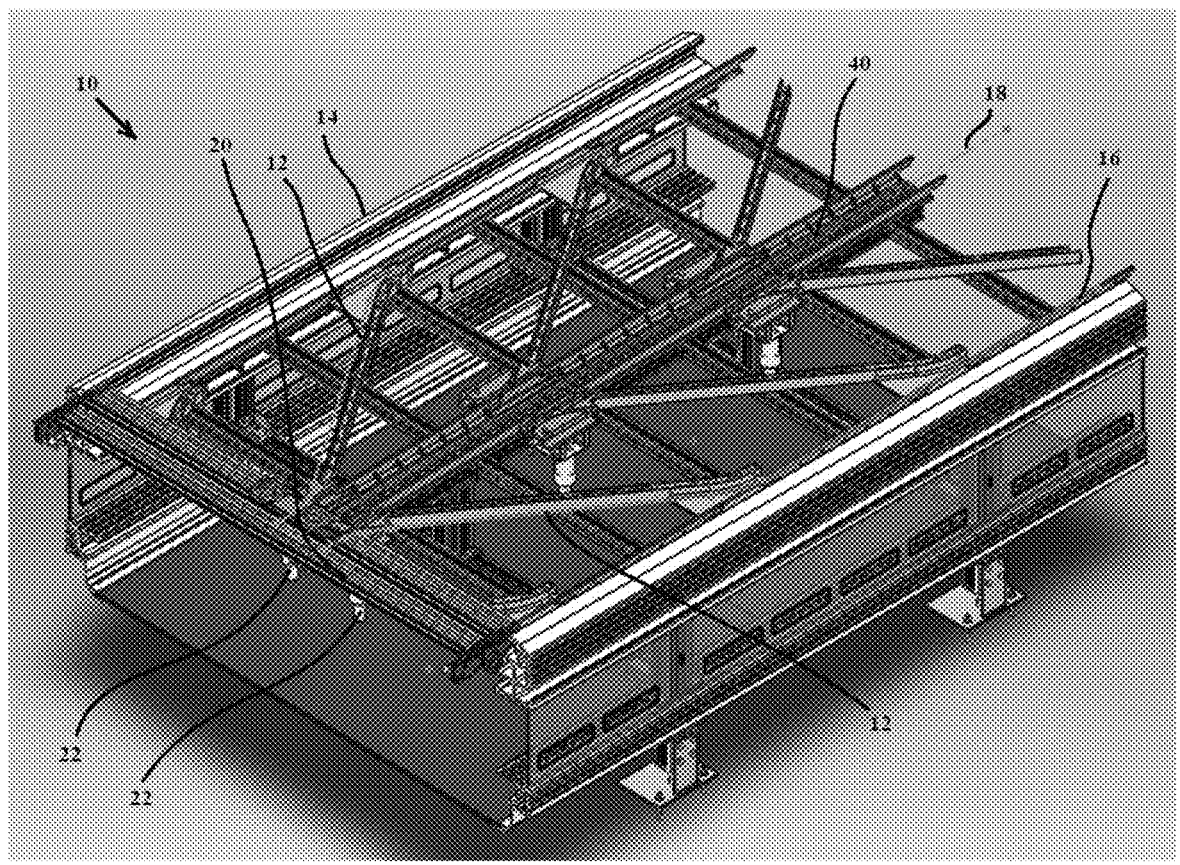
FIG. 1 is a perspective view of a sorter according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms 'first', 'second'. 'third,' etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term 'and/or' includes any and all combinations of one or more of the associated listed items. Expressions such as 'at least one of,' when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

FIGS. 1-5 illustrate example implementation of embodiments of the present disclosure as single slat design where shoes 30 meet in the middle of sorter 10 and align against a centrally located docking station 32 (for example a 'pod').

In an example implementation, both shoes 30 and pod 32 are located on one slat 20. In a further example implementation, slat 20 can utilize a slat removal feature as disclosed in PCT/US18/67375. In yet further example implementation one or more or all shoes 30 can implement smart shoe technology as disclosed in PCT/US18/50025 and/or pin detection technology as disclosed in PCTUS18/66877.

Referring to FIG. 1, a perspective 3D view of sorter 10 is shown with the slats removed for illustrative purposes. In an example implementation, divert rails 12 extend from central rail 40, at an angle with respect to a central axis 18, to the left side 14 and right side 16 of sorter 10. Shoes 30 ride on rails 12 to facilitate packages exiting the sorter 10. In yet further example implementation, drivers 22 (illustrated as 'silver canisters," for example solenoids) power respective diverts 24 (see, for example FIG. 2) to direct one or more shoes 30.

Figure 2:
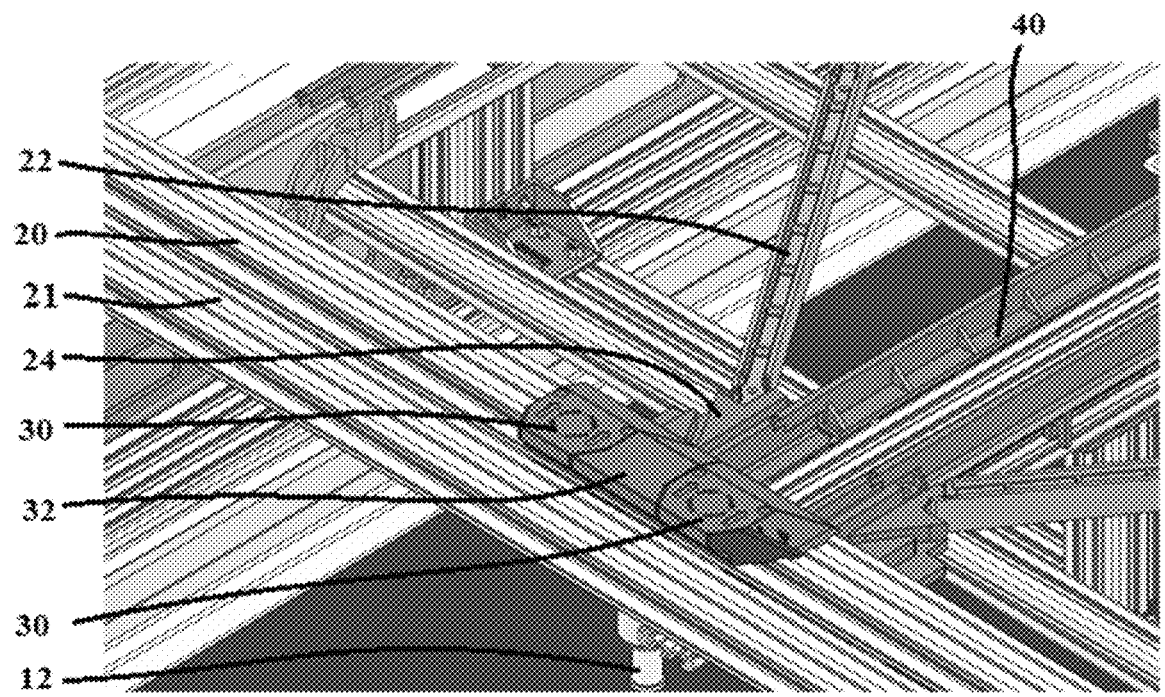
FIG. 2 is a single slat design according to an example embodiment.

FIG. 2 illustrates an example of a single slat design according to example embodiments of the disclosure. In an example implementation a shoe docking pod 32 can be disposed in with respect to a central rail 40. For clarity and to facilitate understanding of an example embodiment of the disclosure, FIG. 2 illustrates only one slat 20 with two shoes 30 and a docking pod 32. According to example implementation, one or more, or all slats of a sorter can be configured in a similar manner where each shoe 30 is sitting on a slat 20 in an initial position (for example docked at a docking pod 32) generally proximate to central rail 40 and to a point where at least one divert rail 12 meets central rail 40. In an exemplary implementation, if a sorter 10 was in operation and a divert 24 was selected, for example by activating its associated driver 22 in a wired or wireless communication with a controller (not shown), then as illustrated in FIG. 4, a required number of one or more shoes 30 would 'divert' to the side 14 (as illustrated by an arrow A) and/or side 16 (as illustrated by arrow C) to push the package off of the sorter 10 as slat 20 advances (as illustrated by arrow B) on sorter 10.

Figure 3:
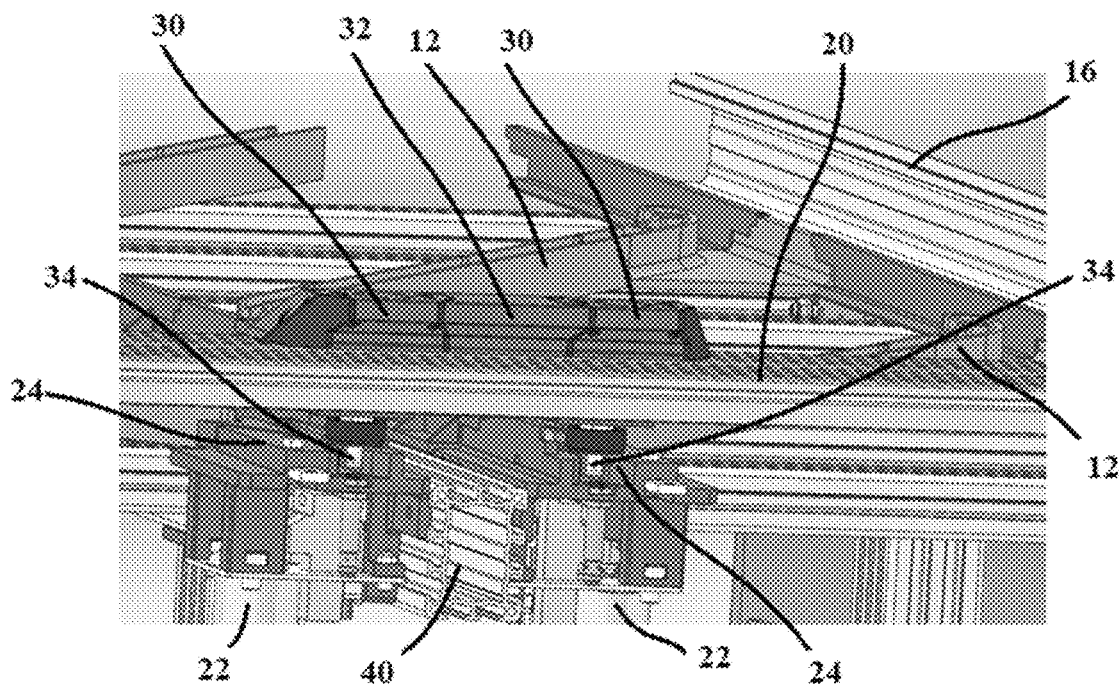
FIG. 3 is a perspective view of a portion of a sorter according to an example embodiment.

FIG. 3 illustrates in more detail an example implementation where one or more divert rails 12 extend from central rail 40 having respective drivers 22 and diverts 24 configured with respect to the central rail 40. In an example implementation, pins 34 of respective shoes 30 ride in respective rails 12 when respective drivers 22 switch or move respective diverters 24 to allow respective pins 34 to divert to respective rails 12 thereby diverting respective shoes 30 to respective side 14 or 16. When respective diverts are not switched or moved, pins 34 do not divert to respective rails 12, and shoes 30 remain docked and/or engage with the docking pod 32 as slat 20 advances on sorter 10 during operation.

Figure 4:
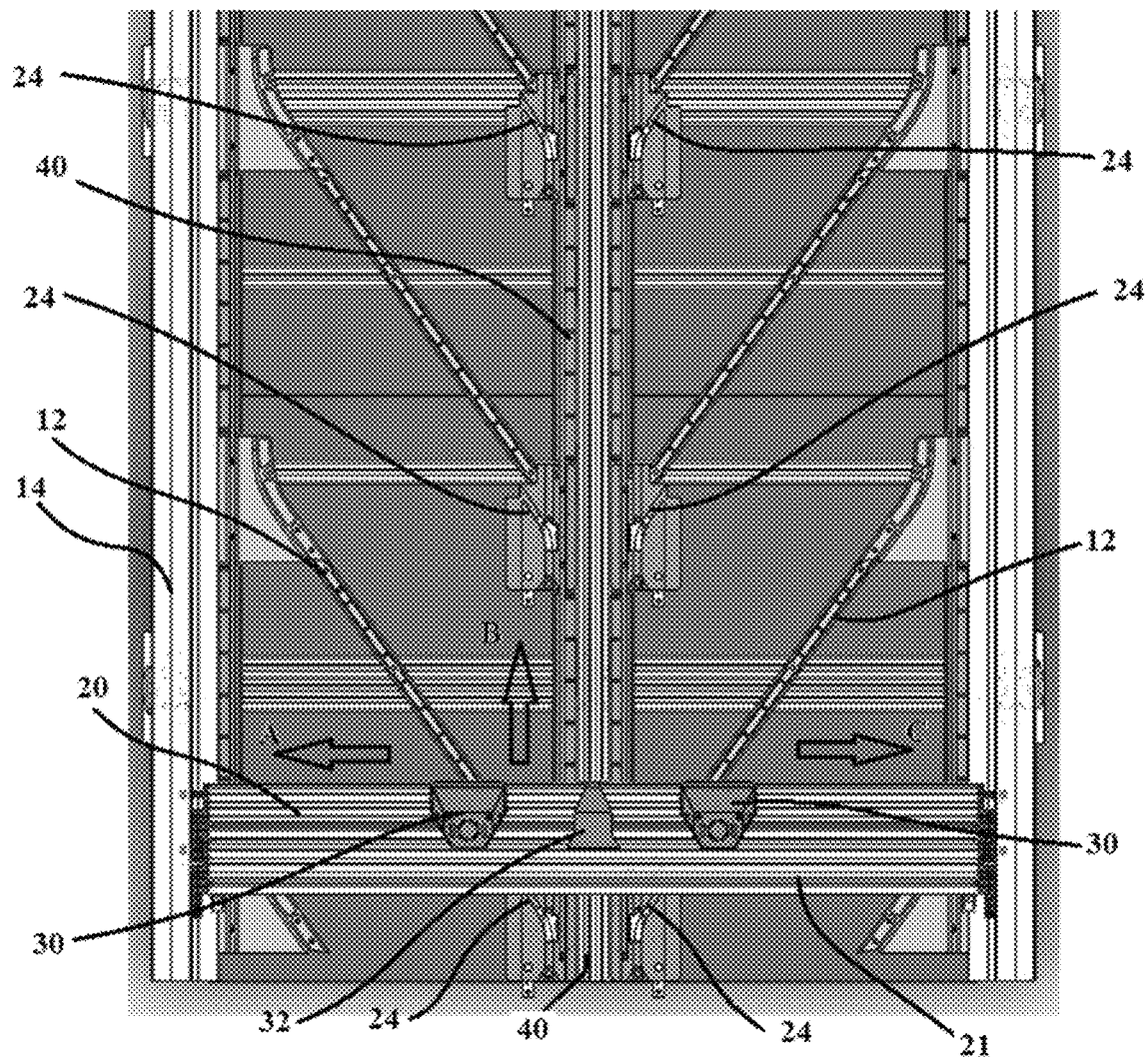
FIG. 4 is atop view of a sorter according to an example embodiment.

FIG. 4 shows atop view of sorter 10 including, for example, one slat 21 added before the slat 20 that has the shoes 30 and docking pod 32 (see also an example of FIG. 2, illustrating a slat 21 with both shoes and the docking station removed). In an example implementation, divert rails 12 and respective diverts 24 can be configured such that shoes 30 can divert to both sides 14 and 16 of the sorter 10.

Figure 5:
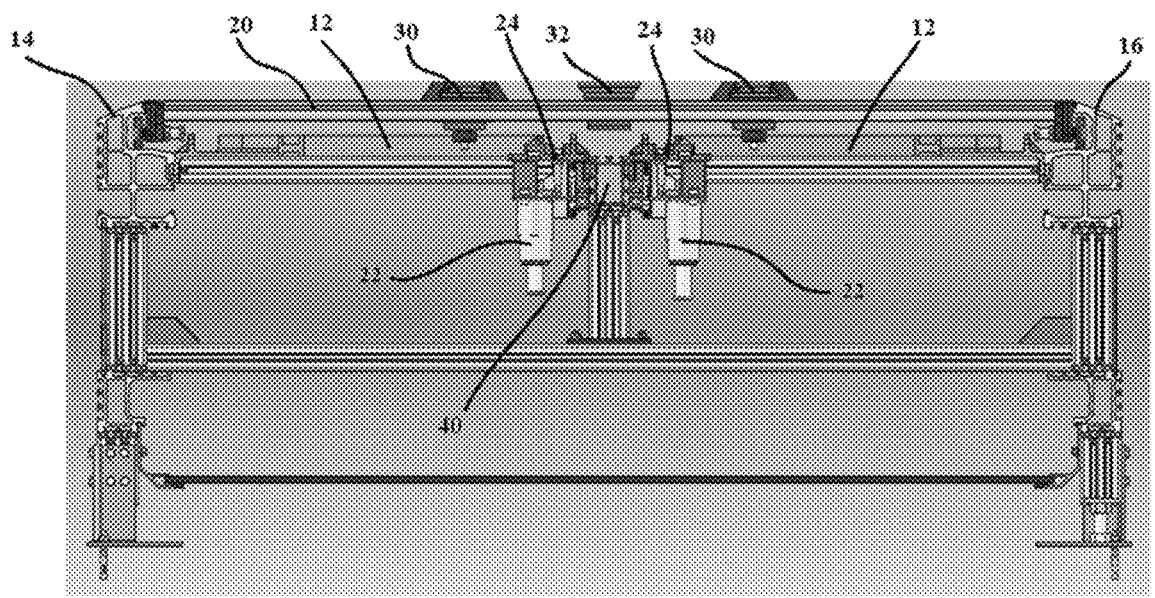
FIG. 5 is a cross-sectional view of a sorter according to an example embodiment.

FIG. 5 illustrates an example of a cross-section, or "end view," of sorter 10 including divert rails 12 extending from central rail 40 to respective sides 14 and 16, shoes 30, dock 32, drivers 22, and diverts 24.

According to one or more example embodiments, one or more shoes and/or one or more pins may include a circuit including a radio frequency transceiver transmitting information uniquely associated with the respective shoe or pin, and a mechanism securing the circuit with respect to the respective shoe or pin.

Figure 6:
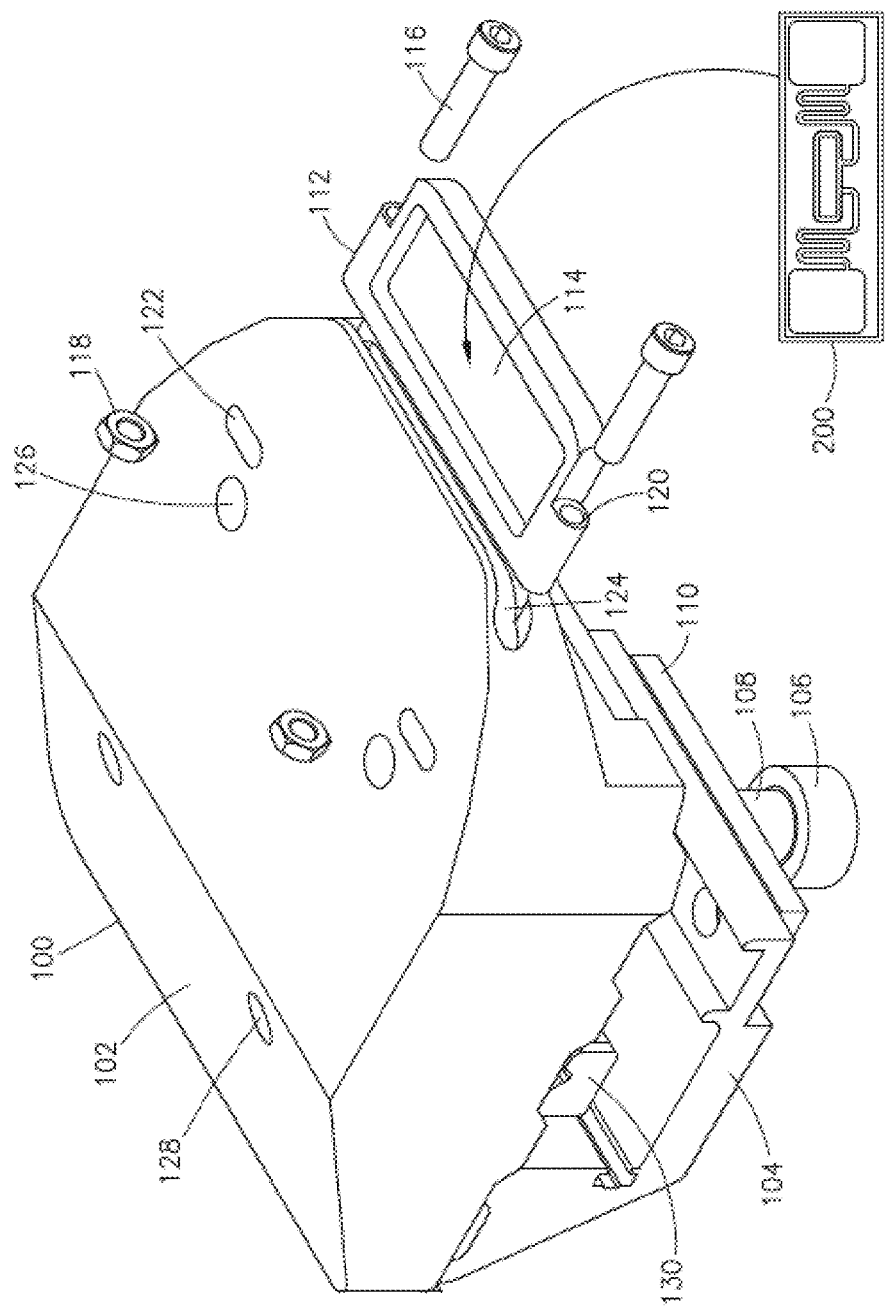
FIG. 6 illustrates a shoe according to an example embodiment.

FIG. 6 illustrates a shoe including a radio frequency transceiver circuit according to an example embodiment. A smart shoe 100 disposed on a sliding assembly 130 comprises a housing 102 including an RFID tag 200 therein. As illustrated, housing 102 can include a slot or compartment 124 for accommodating a tray 112 for an RFID tag 200 such that, once RFID tag 200 is placed in the tray 112, the tray 112 can be secured in the slot or compartment 124, for example by means of one or more screws 116 and nuts 118 attaching one or more portions 120 of tray 112 to housing 102. In yet further example implementation, housing 102 includes one or more mounting areas, such as holes 126, 128, for mounting housing 102 to slat 104. Pin components 106, 108 are connected to slat 104 via a mounting bracket 110.

Figure 7:
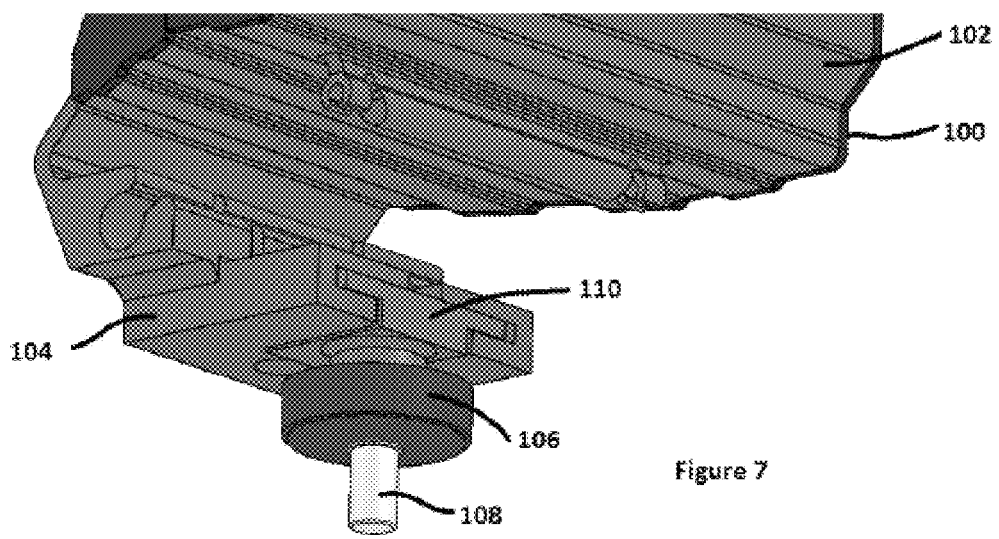
FIG. 7 illustrates an alternate arrangement of pin and roller components according to an example embodiment.

FIG. 7 illustrates an alternate arrangement of pin and roller components of a shoe according to an example embodiment. The bottom of shoe 100 comprises a housing 102 mounted to slat 104 with pin components including roller 116 and pin 118 connected to slat 104 via a mounting bracket 110. During operation, pin components may become dislodged from the show resulting in a missing pin failure and timely detection of the missing pin occurrence is yet another challenge in the field of conveyors and conveyor operation. The pin may include circuit including a radio frequency transceiver transmitting information uniquely associated with the pin component and another mechanism securing the other circuit with respect to the pin component.

While the present invention has been shown and described with reference to certain example embodiments thereof, it will be understood by those skilled in the art that various changes in form and details may be made therein without departing from the spirit and scope. For example, various communication protocols, in wired or wireless communication, can be deployed to control individually, and/or in any combination (such as one or more arrays), drivers 22 and/or diverts 24, and/or various visual and/or audio user interfaces can be implemented to facilitate control and/or displaying information and/or controlling hardware and/or software components of the system.

In addition, the drawing figures further describe non-limiting examples of implementations of certain example embodiments and aid in the description of technology associated therewith.

Other objects, advantages and salient features will become apparent to those skilled in the art from the details provided, which, taken in conjunction with the annexed drawing figures, disclose example embodiments of the invention.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A sorting system comprising:
   a conveyor frame extending along a central axis and comprising a first side and a second side;
   a slat disposed on the conveyor frame and extending from a first end of the slat adjacent to the first side of the conveyor frame to a second end of the slat adjacent to the second side of the conveyor frame;
   a first shoe disposed on the slat, wherein the first shoe is moveable between a central position adjacent to the central axis and a distal position adjacent to the first side of the conveyor frame;
   a second shoe disposed on the slat, wherein the second shoe is moveable between a central position adjacent to the central axis and a distal position adjacent to the second side of the conveyor frame; and
   a docking station disposed on the slat and comprising a first side configured to connect to the first shoe when the first shoe is in the central position and a second side configured to connect to the second shoe when the second shoe is in the central position.

2. The sorting system of claim 1, further comprising a plurality of slats and a plurality of shoes respectively corresponding to the plurality of slats.

3. The sorting system of claim 1, further comprising:
   a divert rail disposed such that a proximal end of the divert rail is adjacent to the central axis and a distal end of the divert rail is adjacent to the first side of the conveyor frame; and
   a diverter disposed adjacent to the central axis and configured to selectively divert the first shoe onto the divert rail and thereby toward the first side of the conveyor frame, as the slat advances along the conveyor frame.

4. The sorting system of claim 3, wherein
   the divert rail is a first divert rail, and the diverter is a first diverter;
   the sorting system further comprises:
   a second divert rail disposed such that a central end of the second divert rail is adjacent to the central axis and a distal end of the second divert rail is adjacent to the second side of the conveyor frame, and
   a second diverter disposed adjacent to the central axis and configured to selectively divert the second shoe onto the second divert rail and thereby toward the second side of the conveyor frame, as the slat advances along the conveyor frame.

5. The sorting system of claim 4, comprising a plurality of each of the slat, the first shoe, the second shoe, the first divert rail, the second divert rail, the first diverter, and the second diverter.

6. The sorting system of claim 3, wherein
   the first divert rail forms an acute angle with respect to the central axis, or
   the second divert rail forms an acute angle with respect to the central axis, or
   the first divert rail forms an acute angle with respect to the central axis and the second divert rail forms an acute angle with respect to the central axis.

7. A sorting system comprising:
   a conveyor frame extending along a central axis and comprising a first side and a second side;
   a plurality of slat units, each slat unit comprising:
   a slat disposed on the conveyor frame and extending, substantially perpendicular to the central axis, from the first side of the conveyor frame to the second side of the conveyor frame, and
   at least one shoe disposed on the slat, wherein the shoe is moveable along the slat between a central position adjacent to the central axis to one of a first lateral position adjacent to the first side of the conveyor frame and a second lateral position adjacent to the second side of the conveyor frame;
   a plurality of first divert units, each configured to selectively divert a shoe from the first position adjacent to the central axis to the second position adjacent to the first side of the conveyor frame; and
   a plurality of second divert units, each configured to selectively divert a shoe from the first position adjacent to the central axis to the third position adjacent to the second side of the conveyor frame,
   wherein the at least one shoe of each slat unit comprises a first shoe which is moveable along the slat between the central position and the first lateral position, and a second shoe which is moveable along the slat between the central position and the second lateral position, and
   each slat unit further comprises a docking station disposed on the slat and comprising a first side configured to connect to the first shoe when the first shoe is in the central position and a second side configured to connect to the second shoe when the second shoe is in the central position.

8. The sorting system of claim 7, wherein each of the first divert units comprises:
   a first divert rail disposed such that a first end of the divert rail is adjacent to the central axis and a second end of the first divert rail is adjacent to the first side of the conveyor frame; and
   a first diverter configured to selectively divert a shoe from the first position adjacent to the central axis onto the first diver rail and thereby toward the first side of the conveyor frame.

9. The sorting system of claim 7, wherein each of the second divert units comprises:
   a second divert rail disposed such that a first end of the divert rail is adjacent to the central axis and a second end of the first divert rail is adjacent to the second side of the conveyor frame; and
   a second diverter configured to selectively divert a shoe from the first position adjacent to the central axis onto the second diver rail and thereby toward the second side of the conveyor frame.

10. The sorting system of claim 7, wherein each slat unit is configured to connect to the at least one shoe when the at least one shoe is in the central position.

* * * * *